(12) United States Patent
Iida

(10) Patent No.: US 6,917,517 B1
(45) Date of Patent: Jul. 12, 2005

(54) PORTABLE INFORMATION RADIO TERMINAL DEVICE AND MANUFACTURING METHOD THEREOF

(75) Inventor: Yuko Iida, Tokyo (JP)

(73) Assignee: NEC Corporation (JP)

( * ) Notice: Subject to any disclaimer, the term of this patent is extended or adjusted under 35 U.S.C. 154(b) by 49 days.

(21) Appl. No.: 09/599,708

(22) Filed: Jun. 22, 2000

(30) Foreign Application Priority Data

Jun. 24, 1999 (JP) .......................................... 11-177730

(51) Int. Cl.[7] .............................................. G06F 1/16
(52) U.S. Cl. ...................... 361/683; 455/403; 455/347; 206/521; 206/588; 206/593; 248/562; 174/255
(58) Field of Search ................................ 361/679, 683, 361/685, 807, 825; 248/560–562, 632; 174/250, 255, 256, 258, 260, 35 R, 35 GC; 206/521, 587, 588, 593, 701, 706; 455/403, 347, 348, 351; 349/149, 151, 56, 58; 429/96–100, 123, 163, 239

(56) References Cited

U.S. PATENT DOCUMENTS

| | | | | |
|---|---|---|---|---|
| 4,912,602 A | * | 3/1990 | Zurek et al. ................ | 361/752 |
| 5,307,508 A | * | 4/1994 | Rollins et al. .............. | 455/347 |
| 5,675,397 A | * | 10/1997 | Fukushima ................. | 349/149 |
| 5,914,864 A | * | 6/1999 | MacDonald, Jr. et al. .. | 361/752 |
| 6,002,588 A | * | 12/1999 | Vos et al. ................... | 361/708 |
| 6,021,041 A | * | 2/2000 | Genix et al. ................ | 361/685 |
| 6,160,703 A | * | 12/2000 | Lopez ........................ | 361/685 |
| 6,201,691 B1 | * | 3/2001 | Nagarajan .................. | 361/685 |
| 6,233,143 B1 | * | 5/2001 | Gamble et al. ............. | 361/685 |
| 6,249,432 B1 | * | 6/2001 | Gamble et al. ............. | 361/685 |
| 6,252,768 B1 | * | 6/2001 | Lin ............................ | 361/687 |
| 6,272,011 B1 | * | 8/2001 | Chen ......................... | 361/685 |
| 6,304,440 B1 | * | 10/2001 | Lin ............................ | 361/685 |
| 6,333,459 B1 | * | 12/2001 | Sato et al. ................ | 174/35 R |

FOREIGN PATENT DOCUMENTS

| | | |
|---|---|---|
| JP | 58-162689 | 10/1983 |
| JP | A-H03-208446 | 9/1991 |
| JP | A-H03-284038 | 12/1991 |
| JP | A-H08-222863 | 8/1996 |

OTHER PUBLICATIONS

Sep. 1, 2003 Japanese Office Action and Translation of relevant portion thereof.

* cited by examiner

*Primary Examiner*—Lisa Lea-Edmonds
(74) *Attorney, Agent, or Firm*—Dickstein, Shapiro, Morin & Oshinsky, LLP.

(57) ABSTRACT

When a portable information ratio terminal device receives impact (external force) due to falling down or the like, electrical connection of an electronic part mounted on a substrate in the device body is held.

The portable information terminal device includes the device body (1H) consisted of mutually combined first and second casings (3) and (4), a printed board (2) provided in the device body and mounting an electronic part (6) and an elastic body (6) supporting the printed board on the device body. The elastic body is provided between the printed board and the first casing and between the printed board and the second casing.

7 Claims, 3 Drawing Sheets

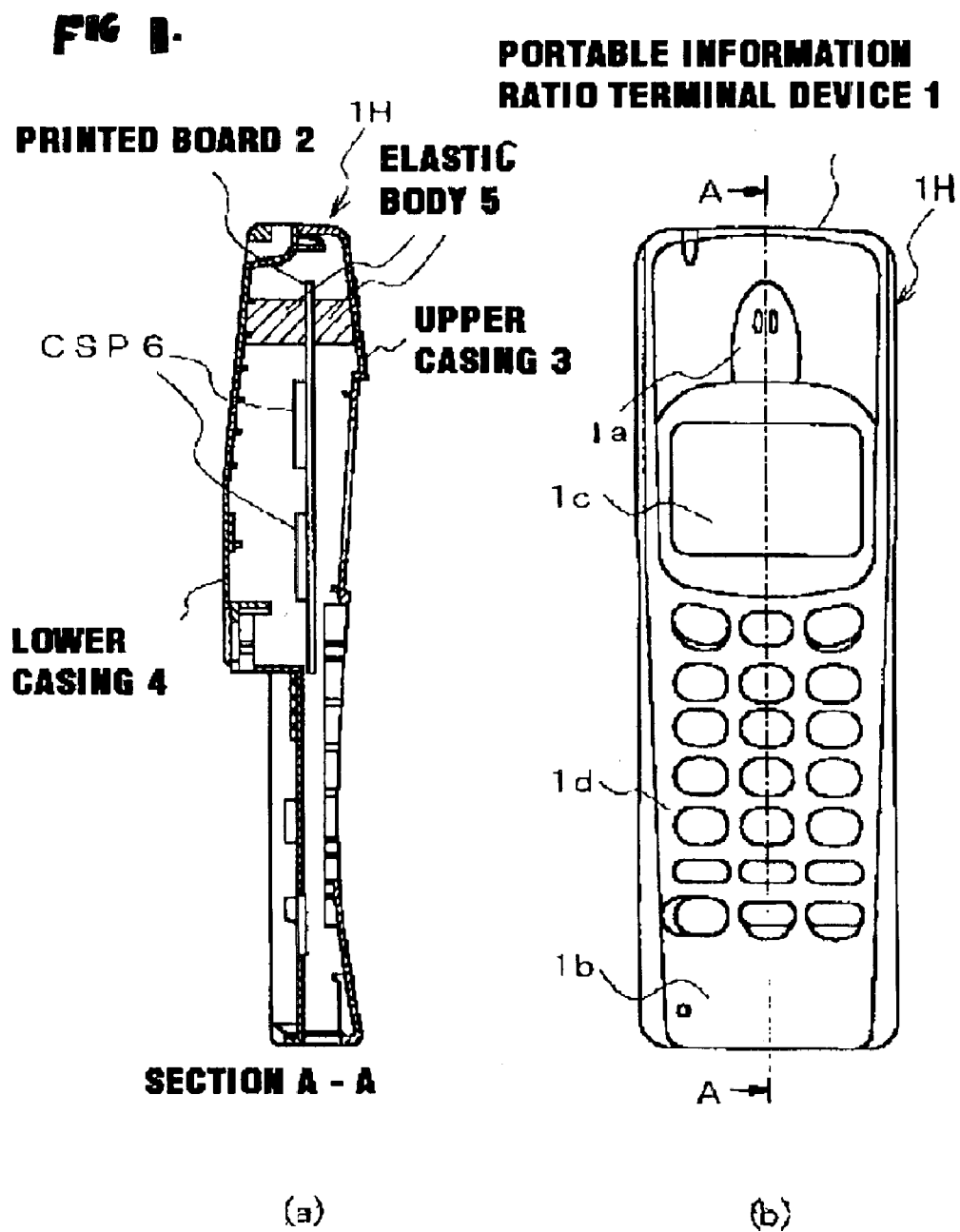

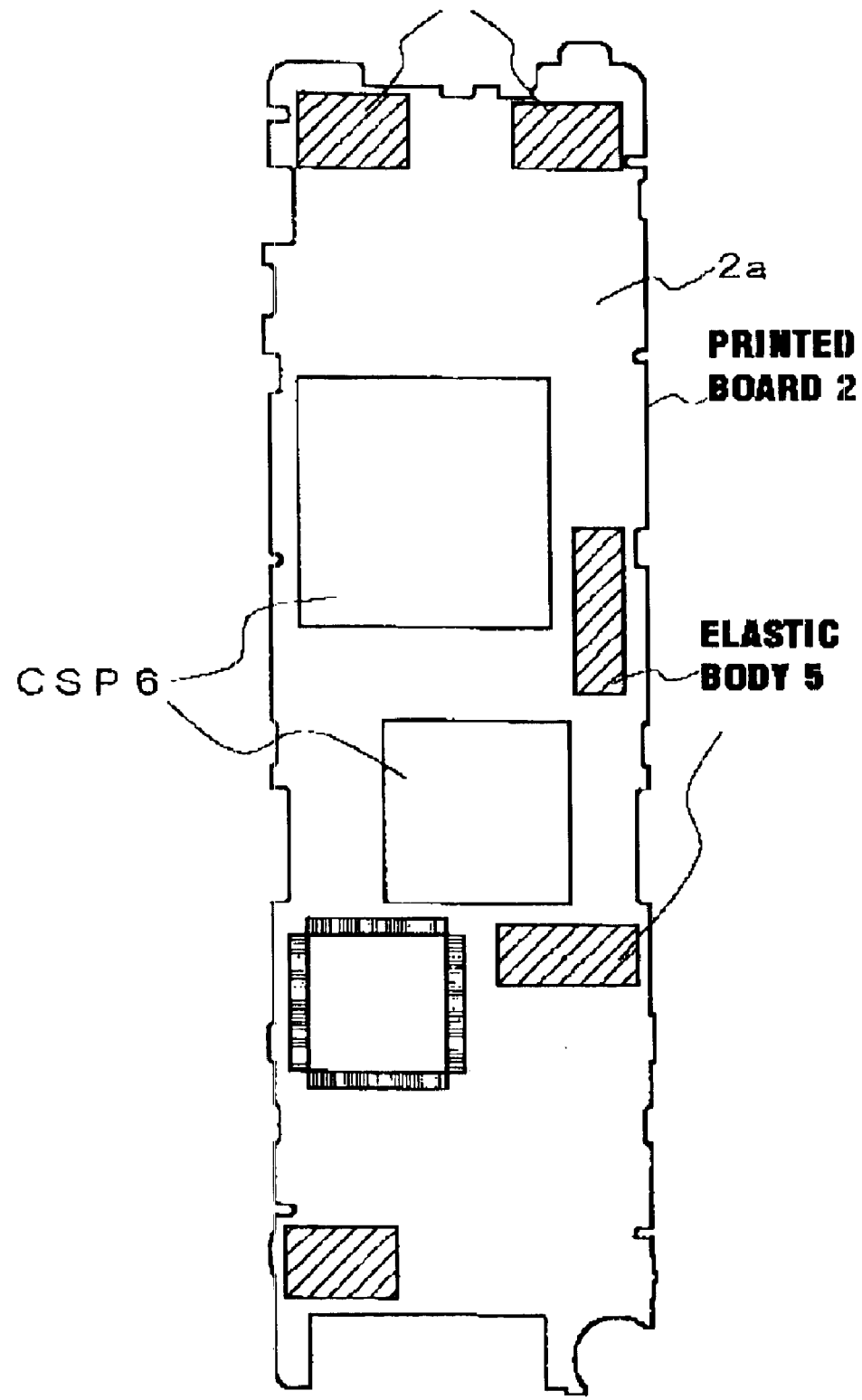
[FIG. 2]

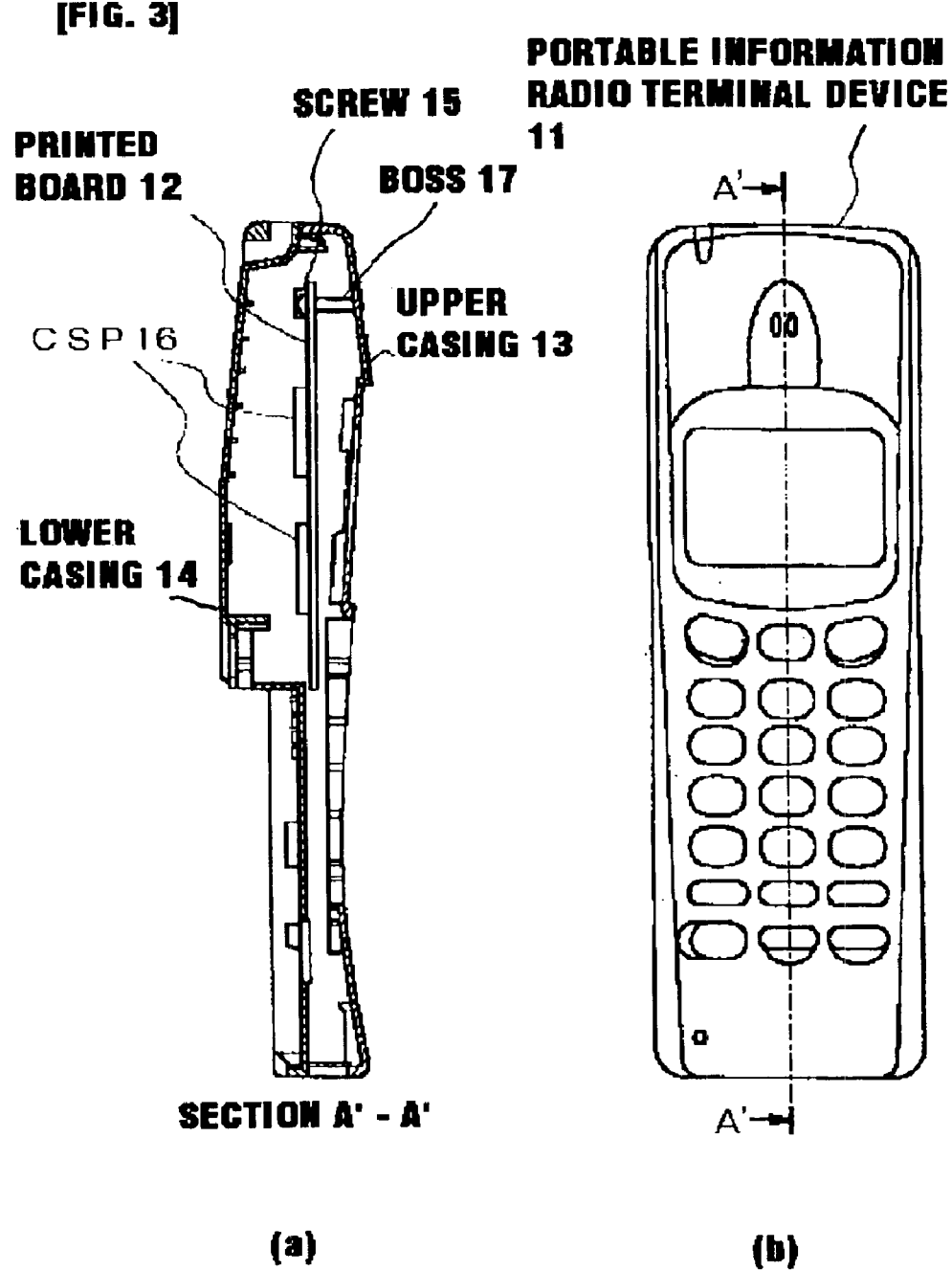

PORTABLE INFORMATION RADIO TERMINAL DEVICE AND MANUFACTURING METHOD THEREOF

BACKGROUND OF THE INVENTION

1. Field of the Invention

The present invention relates generally to a portable information radio terminal device or a personal digital assistance (PDA) and a manufacturing method thereof. More particularly, the invention relates to a portable information radio terminal device and a manufacturing method thereof, which can effectively prevent peeling off, breakage or so forth of an electrical connecting portion of an electronic part mounted on a printed circuit board in a device casing.

2. Description of the Related Art

Conventionally, as shown in FIGS. 3A and 3B, a printed board 12 incorporated in a portable information radio terminal device 11 is secured in a device casing by screws 15 and bosses 17. Accordingly, when an impact is exerted on the portable information radio terminal device 11, portions of the printed circuit board 12 secured by the screws cannot vibrate or deflect in response to the impact, which thereby causes stress to concentrate about the portions secured by the screws to amplify the vibration or deflection of the printed board 12. As a result, peeling can be caused in a solder ball (electrical connecting portion) of a chip size package (CSP) mounted on the printed board 12.

In Japanese Unexamined Utility Model Publication No. Showa 58-162689, the following technology has been disclosed. Disclosed in the above-identified publication is a printed board support structure of an electronic equipment, in which a printed board mounting a printed wiring and various parts, such as relays and so forth, is rigidly fixed in a casing. Elastic engaging projections are projected from a printed board mounting surface of the casing. Also, auxiliary projections are projected in opposition to the elastic engaging projections across the printed board with a distance. In the printed board, engaging holes to engage with the engaging projections are formed for forming the supporting structure of the printed board of the electronic equipment. On the other hand, between each of the supporting portions of the casing and the printed board, elastic member, such as rubber member is disposed with a space portion for accommodating tolerance.

On the other hand, in Japanese Unexamined Patent Publication No. Heisei 8-23181, the following technology has been disclosed. A circuit board has a structure to be tightly clamped by first and second rollers. When the circuit board is inserted between the first and second rollers, the first and second rollers are rotated in a board inserting direction by a frictional force. With such construction, vibrations caused in the equipment casing are absorbed to protect the circuit board from vibration. Furthermore, the circuit board can be smoothly inserted into the casing.

It is desirable to maintain electrical connection of the electronic parts mounted on the board in the device body when the portable information radio terminal device is subject to an impact (external force) due to the device being dropped or so forth. It is also desired that large vibrations and/or impact not be transmitted to the electronic parts within the device body to maintain electrical connection of the electronic parts and to thus not be a cause of failure of the electronic parts.

Also, it is desired to be able to easily produce the portable information radio terminal device to be resistant against such an impact as set forth above.

SUMMARY OF THE INVENTION

It is therefore an object of the present invention to provide a portable information radio terminal device or personal digital assistance (PDA) which can maintain electrical connection of electronic parts mounted on a board in a device body when the portable information radio terminal device is subject to an impact (external force) due to the device being dropped or so forth.

Another object of the present invention is to provide a portable information radio terminal device, in which large vibrations and/or impact will not be transmitted to the electronic parts within the device body to maintain electrical connection of the electronic parts and thus not cause failure of the electronic parts.

A further object of the present invention is to provide a manufacturing method to easily manufacture the portable information radio terminal device to be resistant against such an impact as set forth above.

According to a first aspect of the present invention, a portable information radio terminal device comprises:

a device body;

an electronic part provided in the device body; and an elastic member supporting the electronic part within the device body.

According to a second aspect of the present invention, a portable information radio terminal device comprises:

a device body;

a printed board provided in the device body;

an electronic part provided on the printed board; and an elastic member supporting the printed board within the device body.

In the preferred construction, the device body may include a first and second casing to be assembled with each other, and the elastic member may be disposed between the printed board and the first casing and between the printed board and the second casing.

A direction of an elastic force acting on the printed board from the elastic member disposed between the printed board and the first casing and a direction of an elastic force acting on the printed board from the elastic member disposed between the printed board and the second casing may substantially match a direction of assembling the first and second casings.

The elastic body may be pressurized by assembling the first casing and the second casing. It is also possible that the elastic member is provided at only one side of the printed board in the longitudinal direction, while the other side of the printed board in the longitudinal direction is situated as a free end.

The device body may be divided in its longitudinal direction into first and second halves, and the elastic member may be provided only on one of the first and second halves where the center of gravity of the portable information radio terminal device is located.

A plurality of elastic members may be provided per side of the printed board.

According to a third aspect of the present invention, a manufacturing method of a portable information radio terminal device for assembling a first casing and a second casing, and housing a printed board between the first and second casings, comprises:

a step of arranging the printed board on one of the first and second casings via an elastic member; and a step of assembling the other of the first and second casings to the one of the first and second casings with interpositioning of the elastic member between the other of the first and second casings and the printed board.

Preferably, the first and second casings may be assembled with pressurizing of the elastic member.

The portable information radio terminal device according to the present invention can reduce concentration of stress caused in response to an impact upon dropping the device or so forth by holding the printed board assembled in the device body by the elastic member, made with a material such as an impact absorbing material having a high elastic force.

BRIEF DESCRIPTION OF THE DRAWINGS

The present invention will be understood more fully from the detailed description given hereinafter with reference to the accompanying drawings of the preferred embodiments of the present invention, which, however, should not be taken to be limiting of the present invention, but are provided for explanation and understanding only.

FIGS. 1A and 1B show a first embodiment of a portable information radio terminal device according to the present invention, in which FIG. 1A is a front elevational view, and FIG. 1B is a cross-sectional view taken along line A—A of FIG. 1A;

FIG. 2 is a front elevational view of a printed board and an elastic body of a second embodiment of a portable information radio terminal device according to the present invention; and FIGS. 3A and 3B show a conventional portable information radio terminal device, in which FIG. 3A is a front elevational view thereof, and FIG. 3B is a cross-sectional view taken along line B—B of FIG. 3A.

DESCRIPTION OF THE PREFERRED EMBODIMENTS

The present invention will be discussed hereinafter in detail in terms of the preferred embodiments of the present invention with reference to the accompanying drawings. In the following description, numerous specific details are set forth in order to provide a thorough understanding of the present invention. It will be obvious, however, to those skilled in the art that the present invention may be practiced without these specific details. In other instances, well-known structure are not shown in detail in order to avoid unnecessarily obscuring the present invention.

FIGS. 1A and 1B show a first embodiment of a portable information radio terminal device according to the present invention, in which FIG. 1A is a front elevational view, and FIG. 1B is a cross-sectional view taken along line A—A of FIG. 1A. As shown in FIGS. 1A and 1B, a portable information ratio terminal device 1 has a receiver portion 1a, a transmitter portion 1b, a liquid crystal display portion 1c and an operation portion 1d. A printed board 2 assembled within a device body 1H is held through an elastic member 5.

As shown in FIG. 1B, the elastic member 5 is tightly fitted between an upper casing 3 and the printed board 2 and between a lower casing 4 and the printed board 2 without any gaps under a slightly pressurized condition. If a gap is present, impact absorbing ability and stress distribution performance may be lowered.

When the portable information radio terminal device 1 is subjected to an impact due to the device being dropped or some other reason, a phenomenon occurs in which large vibrations and deflections of the upper casing 3, the lower casing 4 and the printed board 2 assembled in the device body 1H are caused. At this time, vibration and deflection between the upper casing 3 and the printed board 2 and between the lower casing 4 and the printed board 4 are absorbed by the elastic member 5. Also, since the printed board is not bonded to the elastic member 5 at only a single point, and the elastic member 5 does not fix the printed board to prevent vibration or deflection, stress concentration can be avoided. Accordingly, the effects of large vibrations on the printed board per se can be reduced. By this, CPSs mounted on the printed board are less likely to peel off the printed board 2.

As shown in FIG. 1B, the printed board 2 has a longitudinal length of about half of that of the device body 1H and is arranged at approximately the upper half in the longitudinal direction of the device body 1H. On a surface of the printed board 2 opposing to an inner surface of the lower casing 4, electronic parts such as CSPs (Chip Size Packages) are mounted.

Among the components in the portable information radio terminal device 1, the liquid crystal display portion 1c is relatively heavy and constitutes a large proportion of the overall weight of the portable information radio terminal device 1. As shown in FIG. 1A, since the liquid crystal display portion 1c is located in the upper half in the longitudinal direction of the device body 1H, the center of gravity of the portable information radio terminal device 1 is located at the upper side of the center portion in the longitudinal direction. Accordingly, when the portable information radio terminal device 1 is dropped, it inherently falls in an upside-down orientation such that the upper side is most likely to suffer the impact of the collision. For this reason, in order to achieve efficient impact resistance, the printed board 2 is held in the device body 1H by the elastic member 5 positioned at the upper side in the longitudinal direction of the portable information radio terminal device 1 and in the vicinity of the uppermost position of the printed board 2.

The printed board 2 is supported only on the side close to the uppermost position thereof to thereby situate the other end of the printed board 2 in the longitudinal direction as a free end. This works together with the elasticity of the supporting portion (elastic member 5) of the printed board 2 to provide an appropriate degree of elastic deformation in the printed board 2 without causing local stress concentration when an external force is applied to the portable information radio terminal device 1, to thereby cancel energy of the external force acting on the printed board 2. Accordingly, stress concentration will not be caused in the electrical connecting portion of the CSP 6 on the printed board 2 or the CSP per se.

The contact area of the elastic member 5 with the printed board 2 and the contact area of the elastic member 5 with the upper casing 3 or the lower casing 4 are substantially the same size as each other. The contact area is desired to be as large as possible. By providing a large area for supporting the printed board 2 by the elastic member 5, stress is not concentrated when the portable information radio terminal device 1 is subjected to an impact to prevent the printed board from vibrating or deflecting.

As set forth above, the elastic member 5 supporting the printed board 2 abuts with the upper casing 3 and the lower casing 4 of the device body 1H. When the portable information radio terminal device 1 is dropped, it tends to fall down to hit the ground so that the brunt of the impacts occurs either at the upper surface of the upper casing 3, which is the operation panel and the display surface, or at the back surface of the lower casing 4 located on the back side of the device. Accordingly, the elastic body 5 abuts the surfaces extending in a direction of the upper surface and the back surface of the device body 1H so as to enhance its impact absorbing ability.

Bonding of the elastic member 5 onto the printed board 2 and the upper and lower casings 3 and 4 may be achieved using various types of adhesive. In this case, corresponding to a bonding force applied by the adhesive per se, a clamping force may be exerted to depress the elastic member 5 onto the printed board 2 from the upper and lower casings 3 and 4.

The material and elastic modules of the elastic member 5 are selected for effectively absorbing an impact to be exerted onto the portable information radio terminal device 1 upon falling from a height during a normal use condition, and to effectively prevent failure of the electronic parts and/or peeling off of the connecting portion.

In the embodiment shown in FIG. 1(b), the elastic member 5 is arranged both between the printed board 2 and the upper casing 3 and between the printed board 2 and the lower casing 4. In the shown embodiment, the elastic member 5 is composed of mutually separate elastic components respectively disposed between the printed board 2 and the upper casing 3 and between the printed board 2 and lower casing 4. However, instead of forming the elastic member 5 with two separate elastic components, it is possible to form it with a single elastic component with a cut out portion for receiving the printed board 2 therein.

Upon supporting the printed board 2 by an elastic force of the elastic member 5, the direction in which the elastic force is applied onto the printed board 2 matches with a direction in which the upper casing 3 and the lower casing 4 are mated and assembled upon manufacturing of the portable information radio terminal device 1 (horizontal direction in FIG. 1B). Accordingly, upon manufacturing of the portable information radio terminal device 1, in the condition where the printed board 2 is placed at a predetermined position on the inner surface of one of the upper casing 3 and the lower casing 4 via the elastic member 5, the other of the upper casing 3 and the lower casing 4 is fitted via the elastic member 5 arranged on the inner surface. By this process, the elastic member 5 is properly pressurized with respect to the upper casing 3, the lower casing 4 and the printed board 2. In this case, between the upper casing 3 and the lower casing 4 which are preliminarily molded into predetermined shapes, respectively, the elastic member 5 is disposed to automatically and optimally adjust the elastic force of the elastic member 5 acting on the printed board 2. This can be achieved either in the case where the elastic member 5 is formed as two separate elastic components or in the case where the elastic member 5 is formed as one elastic component having a cut out portion.

On the other hand, while not illustrated in the drawings, the elastic member 5 can be provided only on one side between the printed board 2 and the upper casing 3 and between the printed board 2 and the lower casing 4.

Also, the printed board 2 is supported in a cantilever arrangement in which it is supported only at one end thereof in the longitudinal direction of the printed board 2 (but is supported along a wide contact surface) in the shown embodiment. However, it is also possible to support the elastic member 5 at both ends in the longitudinal direction.

Next, a second embodiment of the present invention will be discussed with reference to FIG. 2.

As shown in FIG. 2, the elastic members 5 are arranged in the vicinity of the CSPs 6 mounted on the printed board 2 and are bonded at a plurality of positions on the printed board 2. Among a plurality of elastic members 5, some of the elastic members 5 are arranged on both end portions in the longitudinal direction of the printed board 2. The others of the elastic members 5 are arranged in extension along the outer edge portions of the substantially quadrangular shaped CSPs 6.

In the embodiment shown in FIG. 2, a ratio of total contact area of a plurality (five in the embodiment shown in FIG. 2) of elastic members 5 provided on the surface 2a versus the area of the surface 2a on the side of the printed board where the CSPs 6 are mounted, is about 7.5%. It is also desirable to bond a plurality of elastic members 5 even on the back surface of the surface 2a of the printed board 2. To achieve effective stress distribution or impact absorption, it is desirable to bond the elastic members 5 on the back side of the printed board in a ratio of area greater than or equal to 5%. Furthermore, the elastic members 5 provided at a plurality of positions on both the front surface and back side of the printed board 2 can be provided at corresponding positions of the front surface side and back side, respectively. In the alternative, it is also possible to provide the elastic members 5 at mutually offset positions on the surface side and the back side of the printed board 2.

In the shown embodiment of the portable information radio terminal device 1, by holding the printed board 2 assembled in the device body 1 with the elastic members 5 made of impact absorbing material, solder balls of the CSPs and the like mounted on the printed board 2 can be prevented from breaking or peeling due to vibration or deflection of the printed board 2 in response to the force of an impact caused by the device being dropped or other reason.

In particular, in the embodiment shown in FIGS. 1A and 1B, the printed board 2 assembled in the portable information radio terminal device 1 is held by the elastic member 5, made of a material such as an impact absorbing material, between the upper casing 3 and the lower casing 4. By this arrangement, any stress exerted upon receiving an impact due to the device being dropped or so forth, will not be concentrated at a fixed point and be distributed to prevent the printed board 2 from causing significant vibration or deflection. Furthermore, as shown in FIG. 2, the effect can be further enhanced by bonding the elastic members 5 to a plurality of locations.

It should be noted that while the shown embodiments are constructed to support the printed board 2 by the elastic member or members disposed between the upper casing and the printed board 2 and/or between the lower casing and the printed board 2, the present invention should not be limited to a construction where the printed board 2 is supported only by the elastic member or members 5. When an external force, such as an impact upon being dropped or the like, is exerted on the portable information radio terminal device 1, the printed board 2 is supported at a plurality of positions or with a relatively large area or at a displaceable point so as to distribute the stress to a plurality of positions or to a wide region in order to avoid stress concentration at one location. Therefore, stress can be distributed.

With the embodiments set forth above, one effect is to solve the problem of breakage or peeling off of the CSPs mounted on the board. Therefore, the influence of an impact from dropping the portable telephone can be reduced. The reason is that, by holding the printed board with the elastic member without using any screws, a portion supporting the printed board becomes wider to avoid concentration of the stress upon exertion of an impact, such as by dropping the device, to prevent vibration or deflection of the printed board.

It should be noted that what is supported by the elastic member is not limited to the printed board but can be various other boards on which electronic parts are mounted or can be an electronic part per se.

With the portable information radio terminal device according to the present invention, electrical connection of the electronic parts mounted on the board in the device body can be maintained even upon exertion of an impact (external force) due to dropping the portable information radio terminal device to minimize the possibility of an occurrence of failure of the electronic parts.

Although the present invention has been illustrated and described with respect to exemplary embodiments thereof, it should be understood by those skilled in the art that the foregoing and various changes, omissions and additions may be made therein and thereto, without departing from the spirit and scope of the present invention. Therefore, the present invention should not be understood as limited to the specific embodiments described above but to include all possible embodiments which can be embodied within the scope encompassed by and equivalents of the features set forth in the appended claims.

What is claimed is:

1. A portable information radio terminal device comprising:
   a device body, said device body including a first and second casing assemblable with each other at contact points defining a contact perimeter of said device body;
   a printed board provided in said device body;
   an electronic part provided on said printed board; and
   an elastic member in direct contact with and supporting said printed board inboard of, and without contacting, the contact perimeter of said device body;
   wherein said elastic member is disposed between said printed board and said first casing and between said printed board and said second casing.

2. A method of manufacturing a portable information radio terminal device for assembling a first casing and a second casing, the first and second casings being assemblable with each other at contact points defining a contact perimeter, said device housing a printed board between said first and second casings, comprising:
   arranging said printed board on one of said first and second casings with an elastic member positioned inboard of, and without contacting, the contact perimeter of said one of said first and second casings and between said printed board and said one of said first and second casings to support said printed board; and
   assembling the other of said first and second casings to said one of said first and second casings while interpositioning said elastic member between said other of said first and second casings and said printed board, said elastic member being in direct contact with said printed circuit board.

3. A method of manufacturing a portable information radio terminal device as set forth in claim 2, wherein said elastic member is pressurized upon assembling said first and second casings.

4. A portable information radio terminal device comprising:
   a housing, the housing comprising a first casing and a second casing detachable from the first casing said first and second casings being assemblable with each other at contact points defining a contact perimeter of the housing;
   a printed circuit board; and
   a cushion in contact with both the housing and the printed circuit board so as to support the printed circuit board within the housing, said cushion being positioned inboard of, and without contacting, the contact perimeter of the housing.

5. The device as recited in claim 4, wherein:
   at least a portion of the cushion is in contact with the first casing and at least a portion of the cushion is in contact with the second casing.

6. The device as recited in claim 4, wherein
   the cushion is in contact with the first casing and the printed circuit board; and
   the portable device further comprises a second cushion distinct from the first cushion, the second cushion being in contact with the second casing and the printed circuit board.

7. The device as recited in claim 4, wherein the cushion is disposed at a part of the housing which is proximate to the center of gravity of the portable device.

* * * * *